United States Patent Office 3,830,804
Patented Aug. 20, 1974

3,830,804
FLUORESCENT (PYRIMIDINOTRIAZOLYL)-2-STYRYLBENZOXAZOLES
Robert B. Barbee, Kingsport, Tenn., and Edward C. Taylor, Princeton, N.J., assignors to Eastman Kodak Company, Rochester, N.Y.
No Drawing. Filed Nov. 20, 1972, Ser. No. 307,915
Int. Cl. C09b 23/14
U.S. Cl. 260—240 D                4 Claims

ABSTRACT OF THE DISCLOSURE

This invention relates to novel pyrimidinotriazolyl-2-styrylbenzoxazoles and to these compounds incorporated into filaments, fibers, sheets, films and other shaped articles made of polyester materials having advantageous brightness and/or whiteness.

---

This invention relates to novel compositions of matter. More particularly, this invention relates to novel (pyrimidinotriazolyl)-2-styrylbenzoxazoles and to these compounds incorporated into filaments, fibers, sheets, films and other shaped articles made of polyester materials having especially advantageous brightness and/or whiteness.

Fibers, films, and shaped articles made of normally translucent or transparent polyester materials have an inherent yellowish color which becomes more pronounced as the material ages. The yellowish color is apparent in uncolored or undyed articles made of these polyesters. In the case of dyed or colored articles made from these materials, the inherent yellow color causes a diminished brightness which becomes more pronounced as the material ages.

It is, therefore, an object of this invention to provide novel compositions and shaped articles therefrom which overcome many of the disadvantages of the prior art compositions and articles as regards whiteness and/or brightness.

It is a further object of this invention to increase the utility of polyester materials for use in fibers, filaments, sheets, films and other shaped articles by increasing their brightness without the concomitant loss of other desirable properties.

Other objects will be apparent from the description and claims which follow. These and other objects are accomplished by means of this invention as described more fully hereinafter with particular reference to certain preferred embodiments thereof.

It has been found that the brightness and/or whiteness of uncolored polyester articles can be increased by adding to these materials at least one fluorescent (pyrimidinotriazolyl)-2-styrylbenzoxazole compound of the formula

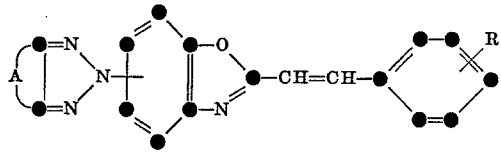

wherein: R represents hydrogen, halo, cyano, carboxy, alkoxycarbonyl, alkanoylamino, or alkyl; A represents

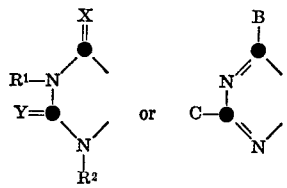

$R^1$ and $R^2$ are the same or different, and each represents lower alkyl, benzyl, or aryl; X and Y are the same or different and each represents oxygen, sulfur, or amino; and B and C are the same or different and each represents amino, mercapto, hydroxy, alkoxy, halogen, alkyl, or aryl.

Typical of the group representative of R are hydrogen, chloro, bromo, fluoro, cyano, carboxy, methoxycarbonyl, decyloxycarbonyl, ethoxycarbonyl, butoxycarbonyl, acetamido, propionamido, butyrylamido, methyl, ethyl, propyl, butyl, dodecyl, octadecyl, etc. Typical of the groups representative of $R^1$ and $R^2$ are methyl, ethyl, propyl, butyl, phenyl, methylphenyl, ethylphenyl, chlorophenol, bromophenyl, methoxyphenyl, ethoxyphenyl, or other substituted phenyl nuclei, and the like. Typical of the groups representative of B and C are amino, mercapto, hydroxy, alkoxy, methoxy, ethoxy, propoxy, decyloxy, chloro, bromo, methyl, ethyl, propyl, dodecyl, octadecyl, phenyl, methylphenyl, ethylphenyl, chlorophenyl, bromophenyl, methoxyphenyl, ethoxyphenyl, or other substituted phenyl nuclei, etc.

In a preferred embodiment of this invention, R represents hydrogen, chloro, lower alkoxycarbonyl, or lower alkyl; $R^1$ and $R^2$ represent hydrogen, or lower alkyl; X and Y are the same and each represents oxygen; and B and C represent hydroxy or lower alkyl. As used herein to describe a substituent containing an alkyl moiety, the word "lower" designates a carbon content of up to about 6 carbon atoms. The term "alkyl" when used to describe a substituent containing an alkyl moiety, represents a straight or branch chain, saturated hydrocarbon backbone having a carbon content of up to about 18 carbon atoms.

The increased brightness and/or whiteness of these materials are unexpectedly long lasting and are highly resistant to light, heat, washing, sublimation, crocking, textile processing baths, dye baths, dry cleaning, bleaches, etc.

The outstanding properties of the articles and compositions embodied in this invention are not primarily dependent upon the way in which the fluorescent (pyrimidinotriazolyl)-2-styrylbenzoxazole compounds of this invention are incorporated therein. For example, incorporating the compound in the polymer prior to extrusion or spinning gives particularly good results, as does incorporation during the process of polymer manufacture. Thus, the novel compounds of this invention can be incorporated in the base material by disperse dyeing procedures; that is, by immersing the substrate or article in aqueous dispersion of a fluorescent (pyrimidinotriazolyl)-2-styrylbenzoxazole compound. Polyester fibers, films, or the like, prepared by melt spinning or extrusion can be prepared by incorporating a fluorescent compound of this invention either directly or as a masterbatch, into the melt from which the article is spun or extruded.

Solution spun fibers having especially advantageous brightness and whiteness which is unexpectedly long lasting can be made by adding one of the fluorescent compounds of this invention to the solution from which the fiber is spun. Cast films having outstanding brightness and/or whiteness which are advantageously long lasting can be made by adding a compound of this invention to the solution from which the film is cast.

The new (pyrimidinotriazolyl)-2-styrylbenzoxazoles of this invention can be prepared by conventional means. A particularly suitable method consists of the condensation of a nitro-2-methylbenzoxazole with an appropriate aromatic aldehyde by the azeotropic removal of water from the reaction mixture containing N-methylpyrrolidone and p-toluenesulfonic acid in xylene. The resulting nitro-2-styrylbenzoxazole can then be reduced chemically with sodium dithionate or iron and acetc acid to the appropriate amino-2-styrylbenzoxazole which, after diazotization in acetic acid, can be coupled to an appropriate aminopyrimidine. Oxidation of this aminoazo compound with copper sulfate and aqueous pyridine produces the desired (pyrimidinotriazolyl) - 2 - styrylbenzoxazole. Coupling of the pyrimidine ring with the diazo compounds is aided by the presence of at least two electron-releasing groups.

Examples of suitable aromatic aldehydes useful for the preparation of the nitro-2-styrylbenzoxazoles are, for example, benzaldehyde, chlorobenzaldehyde, cyanobenzaldehyde, and carbomethoxybenzaldehyde, etc.

An essential feature of the aminopyrimidines useful in the preparation of the compounds of this invention is the presence of a hydrogen on the 5-position of the pyrimidine ring adjacent the amino group. A number of these aminopyrimidines as well as methods for their preparation can be found in D. J. Brown, *The Chemistry of Heterocyclic Compounds,* Vol. 16, A. Weissberger, editor, John Wiley and Sons, Inc., New York, New York (1962), and D. J. Brown, *The Chemistry of Heterocyclic Compounds,* Vol. 16, Sup. 1, A. Weissberger and E. C. Taylor, editors, John Wiley and Son, Inc., New York, New York (1970).

Examples of suitable synthesis are the preparation of 6-amino-1,2,3,4-tetrahydro - 1,3 - dimethyl-2,4-dioxopyrimidine (6-amino-1,3-dimethyluracil) from ethyl cyanoacetate and N,N'-dimethylurea; 4,6-diamino-2-alkylpyrimidines from malondiamidine and simple esters; and amination of chloropyrimidines and of mercapto- and alkylthiopyrimidines. Also, several aminoazo intermediates can be prepared directly: for example, 2-substituted-5-arylazo-4,6-diaminopyrimidines and 2 - substituted-5-arylazo-6-amino-4(3H)-pyrimidinones from amidines and arylazomalononitriles or arylazocyanoacetic acid esters, respectively.

The 6-nitro-2-methylbenzoxazoles are prepared by heating 6-nitro-2-aminophenol with acetic anhydride in any suitable manner known in the art. The 5-nitro-isomer may be prepared similarly.

The new compounds of this invention have special value for the fluorescent whitening of textile materials and especially polyester textile materials. As mentioned hereinabove, the application of the new compounds to polyester fiber can be carried out in the form of aqueous dispersions or the compounds may be introduced into the polymer before melt spinning. The optical brighteners are distinguished by their particularly good lightfastness and substantivity to polyester fiber.

The (pyrimidinotriazolyl) - 2 - styrylbenzoxazole compounds of this invention and their preparation are further illustrated by the following examples.

EXAMPLE 1

The following example describes the preparation of 2-(4 - chlorostyryl) - 6 - (4,6-dimethyl-5,7-dioxo-4,5,6,7-tetrahydropyrimidinotriazol-2-yl)benzoxazole. 7.5 grams of 6-amino-2-(4'-chlorostyryl)benzoxazole is suspended in 270 ml. of hot acetic acid. 39 ml. of 10% hydrochloric acid is then added and the mixture is cooled to 5–10° C., after which it is then treated with 12 ml. of 2.5 N sodium nitrite. This mixture is poured into a solution of 4.3 g. of 6-amino-1,3-dimethyluracil in 60 ml. of acetic acid maintained at 10–15° C. After the addition, a solution of 30 g. of sodium acetate in water is added and the precipitate which forms is removed by filtration, washed and dried. The solid is dissolved in 100 ml. of pyridine to which a solution of 30 g. of copper sulfate-pentahydrate in 100 ml. of water is added and the mixture is heated under reflux for 2 hours, cooled, filtered, washed with water, and dried thereby giving a brown solid. The brown solid material is then dissolved in hot dimethylformamide and a saturated solution of sodium dithionite is added dropwise until the dark color of the solution changes to light yellow. Water is then added to precipitate 3.8 g. of 2-(p - chlorostyryl) - 6 - (4,6-dimethyl-5,7-dioxo-4,5,6,7-tetrahydropyrimidinotriazol-2-yl)benzoxazole. Recrystallization from o-dichlorobenzene and then from dimethylformamide gives a yellow product which melts at 287.5–288.5° C.

EXAMPLES 2-4

The following compounds, listed in Table I, are prepared in a manner similar to the preparation of the compound prepared in Example 1. The nitro compounds are prepared by the condensation of 2-methyl-6-nitrobenzoxazole with the appropriate aromatic aldehyde in a manner similar to that described in copending U.S. Application Ser. No. 244,936, filed Apr. 17, 1972, entitled "Process for the Preparation of 2-Styrylbezoxazoles and 2-Styrylbenzothiazoles." 2-Methyl-6-nitrobenzoxazole is prepared by heating the corresponding 2-amino-5-nitrophenol with acetic anhydride.

TABLE I

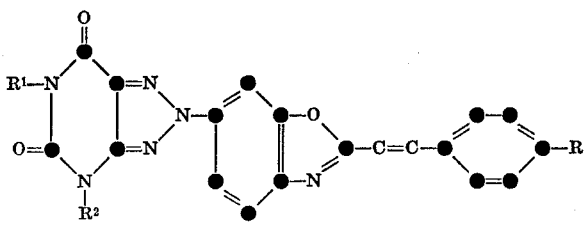

| | | | | Analysis, percent | | | | | |
|---|---|---|---|---|---|---|---|---|---|
| | | | | C | | H | | N | |
| Example | R | R¹ | R² | M.P., °C. | Calc'd | Found | Calc'd | Found | Calc'd | Found |
| 2 | H | CH₃ | CH₃ | 277–278 | 62.98 | 62.26 | 4.00 | 4.13 | 20.99 | 21.22 |
| 3 | CO₂CH₃ | CH₃ | CH₃ | 281–282 | 60.25 | 60.12 | 3.96 | 4.24 | 18.33 | 17.44 |
| 4 | CO₂CH₃ | H | H | >300 | 58.59 | 56.80 | 3.28 | 4.12 | 19.53 | 19.61 |

EXAMPLES 5-16

The following compounds listed in Tables II and III are prepared in a manner similar to the preparation of the compounds prepared in Examples 1–4.

TABLE II

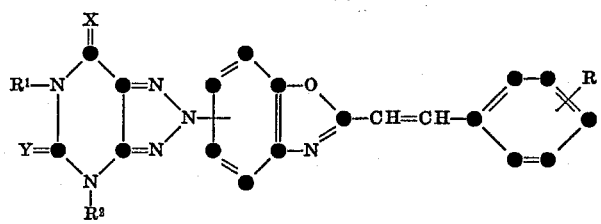

| Example | R | R¹ | R² | X | Y |
|---|---|---|---|---|---|
| 5 | H | CH₃ | CH₃ | O | S |
| 6 | CO₂CH₃ | CH₃ | CH₃ | O | S |
| 7 | H | H | CH₃ | O | O |
| 8 | Cl | H | CH₃ | O | O |
| 9 | CO₂CH₃ | H | H | O | S |
| 10 | CO₂CH₃ | H | H | NH | O |

TABLE III

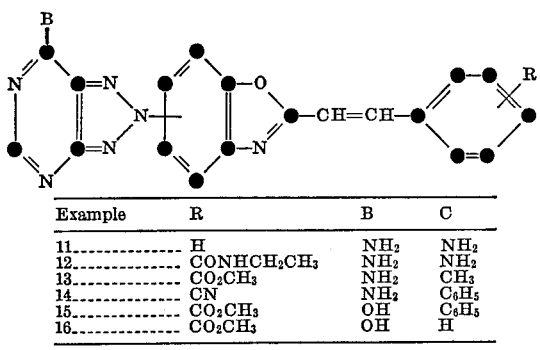

| Example | R | B | C |
| --- | --- | --- | --- |
| 11 | H | $NH_2$ | $NH_2$ |
| 12 | $CONHCH_2CH_3$ | $NH_2$ | $NH_2$ |
| 13 | $CO_2CH_3$ | $NH_2$ | $CH_3$ |
| 14 | CN | $NH_2$ | $C_6H_5$ |
| 15 | $CO_2CH_3$ | OH | $C_6H_5$ |
| 16 | $CO_2CH_3$ | OH | H |

The following example illustrates one method by which the compounds of the invention can be introduced into polyester textile materials:

EXAMPLE 17

An amount of 0.1 g. of the fluorescent compound is dissolved in a dye pot by warming in 5 ml. of 2-methoxyethanol. About 3–5 ml. of a 3% sodium lignin sulfonate aqueous solution is added, with stirring, until a fine emulsion is obtained. Water is then slowly added to a total volume of 300 ml. Then, 3 ml. of an emulsifiable nonionic, modified biphenyl derivative carrier (Carolid: Tanatex Chemical Corp.) are added and 10 grams of a textile fabric made of poly(ethylene terephthalate) fibers are entered. The fabric is worked 10 minutes without heat and then for 10 minutes at 80° C. The bath is then brought to the boil and held at the boil for one hour. Following this the fabric is rinsed in warm water and then scoured in an aqueous 0.2% soap, 0.2% soda ash solution. After scouring the fabric is rinsed with water and dried.

The compounds of the invention can also be applied to polyester textile materials by the heat fixation technique of dyeing. This procedure is described in U.S. Pat. 2,663,612 and in the *American Dyestuff Reporter*, 42, 1 (1953).

Polymeric linear polyester materials of the terephthalate type are illustrative of the linear aromatic polyester textile materials that can be brightened with the compounds of this invention. Examples of linear polyester textile materials that can be brightened with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,466. Poly(ethylene terephthalate) polyester fibers are described, for example, in U.S. Pat. 2,465,319. The polymeric polyester materials disclosed in U.S. Pats. 2,945,010, 2,957,745 and 2,989,363, for example, can be dyed. The linear aromatic polyester materials specifically named have a melting point of at least 200° C. and are sold under the trade names "Kodel," "Dacron" and "Terylene." The novel compounds of this invention are high melting, heat-stable yellow solids which in low concentration in a substrate or solution exhibit, under ultraviolet light, a blue or blue-green to violet fluorescence.

The exact concentration of the novel (pyrimidinotriazolyl)-2-styrylbenzoxazole compound used as a fluorescent whitening or brightening agent for polyester fibers may be varied widely. Particularly good results are obtained at concentrations of about 0.001 to about 1.0 percent by weight of the novel fluorescent (pyrimidinotriazolyl)-2-styrylbenzoxazole compound based on the weight of the polyester material treated. Especially useful results are obtained with poly(ethylene terephthalate) fibers and poly(1,4-cyclohexylenedimethylene terephthalate) fibers containing from 0.01 to 0.5 percent by weight of the novel compounds of this invention.

Because of their excellent heat stability, these compounds can be incorporated into the melt from which a polyester fiber is spun. The resulting polyester composition exhibits excellent whiteness or brightness which is highly resistant to change by the action of light, commercial bleaches, various textile processing treatments and heat.

The following example illustrates the use of compounds of this invention as fluorescent whiteners for a polyester fiber.

EXAMPLE 18

The compounds prepared in Examples 1–16, when incorporated into undyed polyester fiber in a manner taught in Example 17, cause the fiber to exhibit a superior whiteness which remains virtually unchanged by over 20 hours' exposure in a Fade-Ometer. The brightness of the fiber is also substantially unchanged by a series of textile processing treatments which include heat setting; immersion in numerous chemical baths; bleaching and stripping baths, and dye baths. In addition, the optical whitening effect is quite resistant to change by dry cleaning, crocking, gas fading, sublimation, washing and perspiration.

The brightening of dyed colors by the compounds of this invention also has a lasting effect. For example, polyester textile materials containing the compounds prepared in Examples 1–4 when dyed with a full color range of dispersed dyes have an improved brightness and the same fastness properties as samples of the same fabric containing no optical brightener.

Although the invention ha been described in considerable detail with particular reference to certain preferred embodiments thereof, variations and modifications can be effected within the spirit and scope of the invention as described hereinabove, and as defined in the appended claims.

We claim:

1. Compound of the general formula

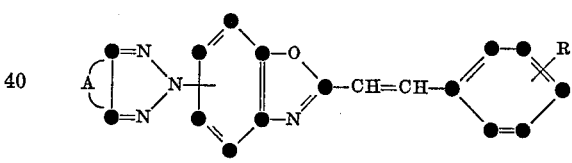

wherein R represents hydrogen, halo, cyano, carboxy, alkoxycarbonyl having 2 to about 18 carbon atoms, alkanoylamino having 1 to about 18 carbon atoms, or alkyl having 1 to about 18 carbon atoms; A represents

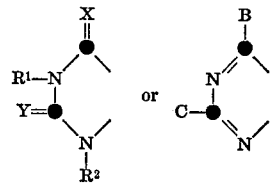

$R^1$ and $R^2$ are the same or different and each represents lower alkyl, benzyl, phenyl, methylphenyl, ethylphenyl, chlorophenyl, bromophenyl, methoxyphenyl or ethoxyphenyl; X and Y are the same or different and each represents oxygen, sulfur or imino, B and C are the same or different and each represents amino, mercapto, hydroxy, alkoxy having 1 to about 18 carbon atoms, halogen, alkyl having 1 to about 18 carbon atoms, phenyl, methylphenyl, ethylphenyl, chlorophenyl, bromophenyl, methoxyphenyl or ethoxyphenyl.

2. The composition of Claim 1 wherein R represents hydrogen, chloro, bromo, or methoxycarbonyl; $R^1$ and $R^2$ represent hydrogen or methyl; and X and Y represent oxygen.

3. The composition of Claim 2 having the formula
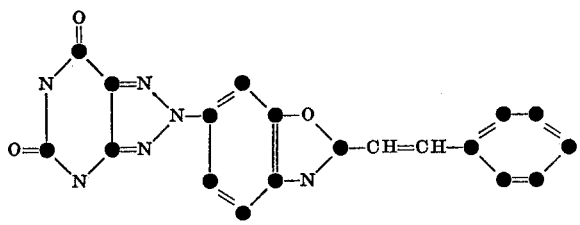
4. The composition of Claim 2 having the formula
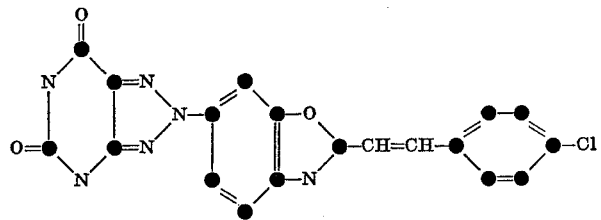
References Cited
UNITED STATES PATENTS
| | | | |
|---|---|---|---|
| 3,158,610 | 11/1964 | Buell | 260—240 D |
| 3,494,919 | 2/1970 | Collins et al. | 260—240 D |
| 3,530,119 | 9/1970 | Schinzel et al. | 260—240 D |
| 3,575,956 | 4/1971 | Crounse | 260—157 |
| 3,674,781 | 7/1972 | Schinzel et al. | 260—240 D |
| 3,689,425 | 9/1972 | Crounse | 252—117 |
FOREIGN PATENTS
| | | | |
|---|---|---|---|
| 668,946 | 2/1966 | Belgium | 260—240 D |
JOHN D. RANDOLPH, Primary Examiner
U.S. Cl. X.R.
117—33.5 R, 33.5 T; 252—301.2 W, 543; 260—37 NP, 40 P, 141, 154, 240.9, 307 D